(12) United States Patent
Brøgger

(10) Patent No.: US 11,000,156 B2
(45) Date of Patent: May 11, 2021

(54) DISPOSABLE GRILL AND METHOD OF MANUFACTURING A DISPOSABLE GRILL

(71) Applicant: Novo Futura IVS, Espergærde (DK)

(72) Inventor: Carsten Nygaard Brøgger, Espergærde (DK)

(73) Assignee: NOVO FUTURA IVS, Espergærde (DK)

( * ) Notice: Subject to any disclaimer, the term of this patent is extended or adjusted under 35 U.S.C. 154(b) by 37 days.

(21) Appl. No.: 16/329,785

(22) PCT Filed: Sep. 2, 2016

(86) PCT No.: PCT/DK2016/050293
§ 371 (c)(1),
(2) Date: Mar. 1, 2019

(87) PCT Pub. No.: WO2018/041312
PCT Pub. Date: Mar. 8, 2018

(65) Prior Publication Data
US 2019/0239688 A1   Aug. 8, 2019

(51) Int. Cl.
*A47J 37/07*   (2006.01)

(52) U.S. Cl.
CPC .............................. *A47J 37/0768* (2013.01)

(58) Field of Classification Search
CPC .................................................. A47J 37/0768
See application file for complete search history.

(56) References Cited

U.S. PATENT DOCUMENTS

| | | | | |
|---|---|---|---|---|
| 3,385,282 A | * | 5/1968 | Lloyd | A47J 37/0768 44/522 |
| 3,394,693 A | * | 7/1968 | Robinson | A47J 37/0768 126/25 A |
| 3,478,733 A | * | 11/1969 | Meyerhoefer | A47J 37/0768 126/9 R |
| 3,684,087 A | | 8/1972 | Anderson | |
| 4,254,863 A | * | 3/1981 | Katcs | A47J 37/0768 126/25 R |
| 4,531,506 A | * | 7/1985 | Chambers | A47J 37/0768 126/25 R |

(Continued)

FOREIGN PATENT DOCUMENTS

| | | |
|---|---|---|
| DE | 202012004383 U1 | 10/2012 |
| JP | 01201422 A | 8/1989 |

(Continued)

OTHER PUBLICATIONS

International Search Report for corresponding application filed Sep. 2, 2016; dated May 4, 2017.

(Continued)

*Primary Examiner* — David J Laux
(74) *Attorney, Agent, or Firm* — Cantor Colburn LLP

(57) ABSTRACT

The invention relates to a disposable grill (1) comprising a base tray (2) as an outer grill cover made in a flammable material, a fuel (3) shaped in a combustible biomass material, and an insert structure (4) made in a heat insulating material for holding said fuel (3) and being partly or fully covered by said base tray (2), wherein at least one wall thickness of at least one location in said insert structure (4) being defined by one or more characteristics of said fuel (3) and said base tray (2). The invention also relates to a method of manufacturing a disposable grill.

21 Claims, 7 Drawing Sheets

(56) References Cited

U.S. PATENT DOCUMENTS

| | | | |
|---|---|---|---|
| 5,293,859 A | 3/1994 | Lisker | |
| 6,941,941 B1 | 9/2005 | Hall | |
| 10,016,090 B2 * | 7/2018 | Brogger | A47J 37/0768 |
| 10,455,980 B2 * | 10/2019 | Brogger | A47J 37/0763 |

FOREIGN PATENT DOCUMENTS

| | | | |
|---|---|---|---|
| JP | 3004424 U | 11/1994 |
| JP | 07077395 A | 3/1995 |
| JP | 2009019155 A | 1/2009 |
| KR | 100831147 B1 | 5/2008 |
| KR | 101643645 B1 | 7/2016 |
| WO | 2014144661 A1 | 9/2014 |
| WO | 2016064027 A1 | 4/2016 |

OTHER PUBLICATIONS

Japanese Office Action for corresponding appiication 2019-512203; Report dated Jul. 14, 2020.

* cited by examiner

DISPOSABLE GRILL AND METHOD OF MANUFACTURING A DISPOSABLE GRILL

FIELD OF THE INVENTION

The invention relates to a disposable grill and a method of manufacturing a disposable grill.

BACKGROUND OF THE INVENTION

Disposable grills have been known in the art for years. Such one-time grills usually comprise a base tray made from thin aluminium plates which is pre-filled with charcoal lumps or briquettes and covered by a thin metal grate.

Such disposable grills are convenient to use when hiking, on the beach and in outer circumstances where you want to grill without bringing along or investing in a traditional grill.

However, after use the disposable grill is still hot for a longer time period and therefore difficult to dispose of properly. Thus, the disposable grill is often left in the nature where it takes a very long time to decompose.

Thus, from the German utility model DE 20 2012 004 383 U1 it is known to form a disposable grill from plant material to ensure that the grill is biodegradable after use. To make the grill fireproof and thus ensure that the grill does not burn during use the plant material is mixed with earthy ingredients such as minerals or stone dust. However, this type of grill is expensive and due to the minerals mixed into the plant material it still takes a relatively long time for the grill to decompose.

Another example of a disposable grill is known from International patent application WO 2014/146661 A1.

An object of the present invention is therefore to provide for a cost-efficient disposable grill which is more environmentally friendly and easy to decompose.

Another object of the present invention is to provide a method of manufacturing the above-mentioned disposable grill.

THE INVENTION

The invention provides for a disposable grill comprising
a base tray as an outer grill cover made in a flammable material,
a fuel shaped in a combustible biomass material, and
an insert structure made in a heat insulating material for holding said fuel and being partly or fully covered by said base tray,
wherein at least one wall thickness of at least one location in said insert structure being defined by one or more characteristics of said fuel and said base tray.

The disposable grill with at least one wall thickness defined in accordance with the requirements of fuel and base tray characteristics is advantageous in that a lower material use in the insert structure is possible by the knowledge of fuel and base tray characteristics. The disposable grill is hereby more environmentally friendly and easy to decompose as well as cost efficient in the manufacturing process.

The shaped fuel also ensures that the burning time of the disposable grill is of a consistent length. The subsequent cooling down time period for a given type of disposable grill is hereby also easy to determine. The time period suggests when the grill is ready to be disposed in a safe manner for the user and the local environment.

It should be emphasised that the term "fuel" in this context should be interpreted as a heat source in a disposable grill wherein the fuel has the original shape before being ignited i.e. not yet degraded in shape by the grill fire.

It should be emphasised that the term "insert structure" in this context should be interpreted as an insert unit or loose insert material maintained or fixed to form an insert unit under normal handling conditions of a disposable grill and at least until an ignition of the grill.

In an aspect of the invention, said fuel is plate shaped with at least substantially even upper and lower surfaces. The even surfaces ensure a well-defined and uniform radiation of heat content from the large surfaces of the fuel making it possible to determine the necessary wall thicknesses in the insert structure.

In another aspect of the invention, one of said characteristics includes the length $L_F$ and width $W_F$ of said shaped fuel being substantially larger than the thickness $D_F$ of said fuel e.g. a thickness $D_F$ between 12 and 15 millimetres such as approx. 14 millimetres in relation to a width and length larger than 100 millimetres of said fuel such as a width range of 150 to 180 millimetres and a length range of 240 to 270 millimetres. The characteristic of the fuel in relation to length, width and thickness ensures that the fuel mainly radiates heat content up and down in the insert structure and less toward the side walls of the disposable grill. The radiated heat content is also more well-defined which makes it easier determine the necessary wall thicknesses in the insert structure. The lesser thickness of the shaped fuel also makes ignition of the fuel in the disposable grill easier.

In an aspect of the invention, one of said characteristics includes size, shape and/or number of elements in said fuel e.g. a number of circular shaped briquettes such as between 2 and 36 briquettes and preferably 24 briquettes. The number of elements of the same shape provides a fuel packing a tray of the insert structure fully while providing an even upper and lower surface of the fuel.

In aspects of the invention, said fuel is charcoals or one or more briquettes shaped in compressed coal or biofuel powder. Hereby are advantageous embodiments of the invention achieved.

In an aspect of the invention, said insert structure is shaped as a tray with sidewalls and a bottom part in a heat insulating material. Hereby, is ensured that the fuel is maintained in a desired position inside the disposable grill and hereby allowing the wall thicknesses of insert structure to be defined at advantageous minimum values in relation to material use.

In an aspect of the invention, said fuel being held or clamped in said tray of the insert structure by selection of the lengths and widths of said tray and fuel. Hereby, it achieved a fuel which radiates heat content in a well-defined manner in any direction within the disposable grill as designed and thus avoiding any base tray hotspots.

In an aspect of the invention, said wall thickness being the same for at least one location in each sidewall or the same for at least one location in each sidewall and bottom part of said insert structure. Hereby, it is possible to provide an insert structure which is easier to manufacture and decompose after use of the grill.

In an aspect of the invention, the wall thickness Y, $Y_1$, $Y_2$ is larger in said bottom part than the wall thickness X in any sidewall of said insert structure. Hereby, it is possible to avoid larger work temperature differences between the outer surfaces of the side walls and the bottom part of the disposable grill.

In an aspect of the invention, the wall thickness X of the side walls is in the range of 15 to 40 millimetres such as preferably approx. 25 millimetres. Hereby are achieved advantageous values for the disposable grill.

In an aspect of the invention, said base tray is made in a cardboard material with one of said characteristics including an autoignition temperature above approx. 218° C. The autoignition temperature should be understood as the lowest temperature at which a base tray when heated may take fire in air and continues to burn. Embodiments of the invention advantageously provide the possibility of maintaining the base tray at a temperature below the autoignition temperature via correctly defined wall thicknesses of the insert structure e.g. a temperature just below the autoignition temperature to provide a particularly light weight disposable grill with tiny wall thicknesses in the insert structure.

In an aspect of the invention, one of said characteristics includes a predefined weight of said fuel such as a weight between 200 and 1500 grams and preferably between 250 and 350 grams such as approx. 300 grams in a standard size or preferably between 700 and 1500 grams such as approx. 1100 grams in a king size version. The suggested weight ranges of the fuel are advantageous in relation to obtaining different types of disposable grills such as disposable grills in standard and king sizes having insert structures with the necessary wall thicknesses. The weight of the shaped fuel may especially be reduced in relation to standard loose charcoals as the fuel is particularly efficient by burning in a more defined and predictable manner.

In an aspect of the invention, said insert structure is made in a perlite material. Forming and moulding the thermal insulating insert structure from perlite is advantageous in that perlite in expanded form is an inexpensive, light, fireproof material with a low thermal conductivity making it particularly suited for use in relation with a disposable grill.

In an aspect of the invention, said insert structure is an insert made in a moulded heat insulating material or made in an otherwise fixed heat insulating material e.g. loose material fixed more or less with a binder or cover material to maintain a position. Hereby are advantageous embodiments of the invention achieved.

In an aspect of the invention, said at least one wall thickness of said insert structure being defined by one or more desired work temperature on the outer surfaces of said base tray e.g. a desired work temperature $T_l$, $T_r$ between 40 and 80° C. such as between 45 and 60° C. e.g. approx. 50° C. for the outer side wall surfaces of the base tray and/or a desired temperature $T_{down}$ between 80 and 170° C. such as between 100 and 140° C. e.g. approx. 120° C. for the outer bottom surface of said base tray. The use and allowance of different work temperatures on the outer surfaces of the base tray is advantageous in relation to reducing wall thicknesses to a minimum. The manufacturing process of the insert structure may also be simplified by allowing use of substantially similar wall thicknesses in the side walls and bottom parts of the insert structure. The work temperatures are defined in relation to normal weather conditions such as a temperature of 15 to 20° C. and calm winds at a disposable grill in use.

In an aspect of the invention, said at least one characteristic includes the radiated heat content Q of said predefined amount of combustible biomass material. Hereby it is possible to adapt wall thicknesses of different locations in the insert structure independently to a minimum in relation to temperatures of the grill e.g. to allow a higher temperature in one location of the grill such as underneath the grill and restrict temperatures in other locations of the grill such as on the outer surface of the side walls in the grill.

In an aspect of the invention, said radiated heat content Q is in a range of 5,000 to 9000 calorie/gram such as approx. 7000 calorie/gram. Hereby is achieved an advantageous embodiment of a disposable grill.

In an aspect of the invention, the bottom part of said insert structure has a wall thickness Y between 20 and 70 millimetres such as 30 millimetres. Hereby is it possible to achieve a desirable work temperature beneath the bottom part surface of disposable grill without having to manufacture a bulky grill as the wall thickness Y of the designed grill is reduced to a minimum thickness.

In an aspect of the invention, at least one layer of loose heat insulating material is positioned between said insert structure and base tray e.g. below the bottom part of said insert structure. Use of loose heat insulating material beneath the insert structure provides the advantageous possibility of reducing the wall thickness in the bottom part of the insert structure. Especially as the loose heat insulating material and the thinner insert structure is easier to dispose of in relation to one thick moulded insert structure.

In another aspect of the invention, said at least one layer of loose heat insulating material has a wall thickness $Y_2$ between 10 and 40 millimetres such as approx. 15 millimetres and said insert structure has a wall thickness $Y_1$ between 10 and 40 millimetres such as approx. 15 millimetres. Hereby is achieved an advantageous embodiment of the invention with a cost- and material-efficient use of heat insulating material based on the knowledge of the fuel and base tray characteristics. Further, the loose heat insulating material will separate the fuel from the base tray if the insert structure should be severally damaged during use.

The invention also relates to a method of manufacturing a disposable grill comprising a base tray as an outer grill cover made in a flammable material and at least one insert structure in a heat insulating material. Said method comprising the steps of:

selecting a fuel shaped in a combustible biomass material to be located in said insert structure, defining at least one wall thickness of at least one location in said insert structure by using one or more characteristics of said fuel and said base tray, positioning said fuel in the insert structure, and covering said insert structure including the positioned fuel with said base tray.

Hereby is achieved an advantageous method for manufacturing a disposable grill.

The abovementioned method may in an embodiment be used in manufacturing a disposable grill according to any of claims 1 to 21.

FIGURES

The invention will be described in the following with reference to the figures in which FIG. 1 illustrates an example of a well-known disposable grill in perspective, FIGS. 2a to 2c illustrate an embodiment of a disposable grill according to the invention using a fuel shaped in a combustible biomass material, FIGS. 3a and 3b illustrate another embodiment of a disposable grill according to the invention, FIG. 4 illustrates parts and dimensions of the disposable grill shown in FIG. 2a in greater details, FIG. 5 illustrates parts and dimensions of another embodiment of the disposable grill according to the invention in greater details, FIGS. 6a and 6b illustrate radiated heat content from an embodiment of the disposable grill according to the invention, and FIG. 7 illustrates a flow diagram disclosing a method of manufacturing a disposable grill.

DETAILED DESCRIPTION

FIG. 1 illustrates in perspective an example of a well-known disposable grill 1 pre-filled with a separate combustible heat source 3 in the form of charcoal lumps.

The charcoal lumps are carried in the grill by a container 2 shaped as a tray. The container 2 is positioned on a lower support structure 4 which is adapted to lift the container 2 off the underlying ground during use of the grill.

The container 2 is made from a flammable material such as wood chips and sawdust with a substantially fireproof surface coating such as hardened clay. The different materials are all disposable in an environmentally friendly way after use of the grill.

A normal grill in a standard size usually has the length and width dimensions of 320 and 250 millimetres with 400 to 600 gram charcoals. A normal grill in a king size usually has the length and width dimensions of 480 and 320 millimetres with 800 to 1200 gram charcoals.

FIG. 2a illustrates a cross sectional view through the middle of the disposable grill 10 as seen from the side.

Figure 1:
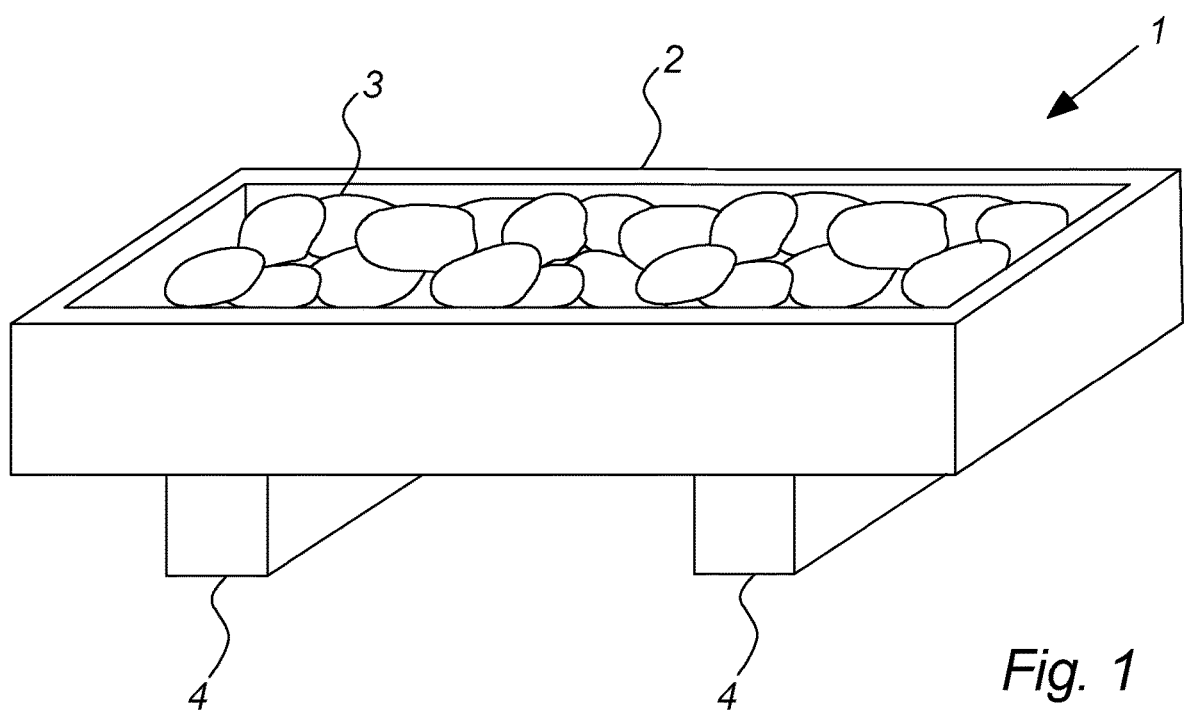

The disposable grill 10 is illustrated with an insert structure 11 made in a heat insulating material. The insert structure 11 comprises four side walls 18a-18b protruding upwards from a bottom part 17 of the insert structure to form a tray 14 with an opening at top. The tray contains a fuel 12 shaped in a combustible biomass material such as charcoals or compressed coal or biofuel powder.

The disposable grill 10 also comprises a base tray 13 as an outer grill cover made in a flammable material. The base tray 13 may fully cover the insert structure 11 and the fuel 12 before use of the disposable grill 10 e.g. as a transport protective cover. An upper part of cover is removed for the grill to be ready for use. The base tray 13—as the remaining grill cover—covers most of the four side walls 18a-18b of the insert structure and the bottom part 17 during use. The uppermost section of the side walls 18a-18b is not covered by the base tray 13—as illustrated in the figure.

The fuel is illustrated with even upper and lower surfaces 15, 16 and has through going holes 19. The through going holes 19 ensure that the fuel 12 will burn uniformly in the tray 14 of the insert structure 11.

The insert structure 11 is to be understood as any kind of device, means, arrangement or other made from a thermal insulating material capable of significantly lowering the thermal conductivity. Such insulating material may include any kind of material having a low thermal conductivity i.e. typically below 0.5 watts per meter kelvin (W·m−1·K−1) such as perlite, mineral wool or foam, ceramic insulation tiles, glass foam, polyurethane foam, paper, expanded polystyrene, expanded clay, amorphous volcanic glass, slag or other or any combination thereof. However, to also be fireproof some of the listed materials would have to be coated or otherwise treated with one or more fire-retardants' or be mixed or coated with other materials ensuring the fireproof quality of the insert structure.

The insert structure 11 and the base tray 13 are made in a perlite material and cardboard, respectively, in a preferred embodiment of the invention.

Figure 2A:
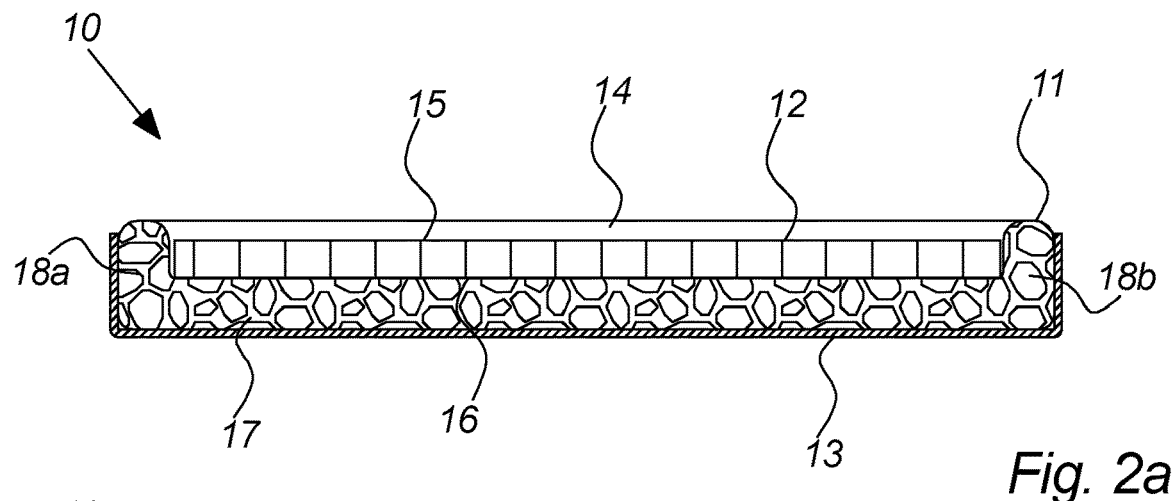
FIGS. 2a to 2c illustrate an embodiment of a disposable grill 10 according to the invention using a fuel shaped in a combustible biomass material.
Figure 2B:
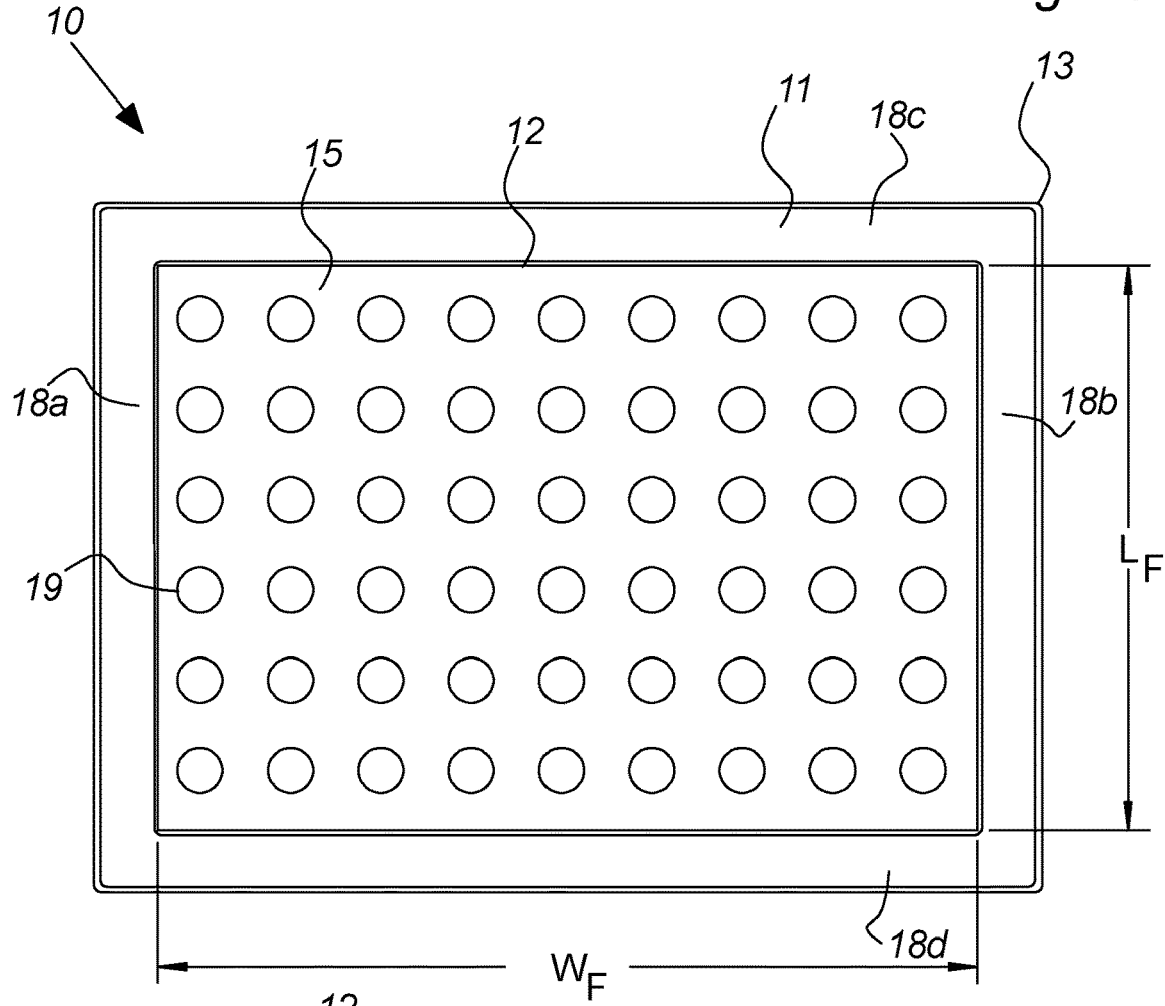

FIG. 2b illustrates the disposable grill 10 from FIG. 2a including the fuel 12 as seen from above.

The tray 14 of the insert structure 11 with the four side walls 18a-18d is illustrated as enclosing the fuel 12 firmly in the length and width directions. A pattern of the through going holes 19 in the fuel 12 is also illustrated in the upper surface 15 of the fuel 12. The upper edge of the base tray 13 enclosing the insert structure 11 and the four side walls 18a-18d is also visible.

The length $L_F$ and width $W_F$ of the fuel 12 are also included in the figure.

Figure 2C:
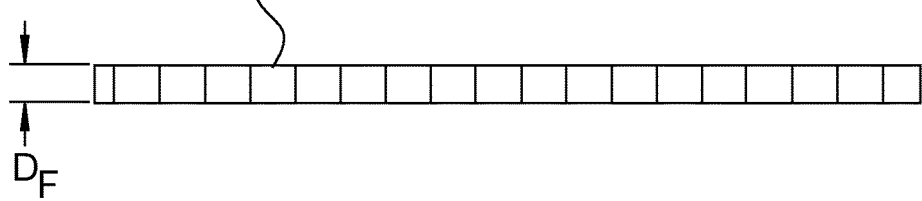

FIG. 2c illustrates a cross sectional view through the middle of the fuel from FIG. 2a as seen from the side.

The fuel 12 has a depth/thickness $D_F$ which is many times smaller than the length and width of the fuel 12 as illustrated in FIG. 2b.

The fuel may include other through going hole patterns than the suggested holes in order for the fuel to burn uniformly.

The fuel illustrated in FIGS. 2a-2c may also be divided into a number of fuel elements positioned next to each other in order to establish a fuel corresponding to the illustrated single fuel element e.g. two or four fuel elements positioned side by side or four fuel elements configured in a two by two matrix.

Figure 3A:
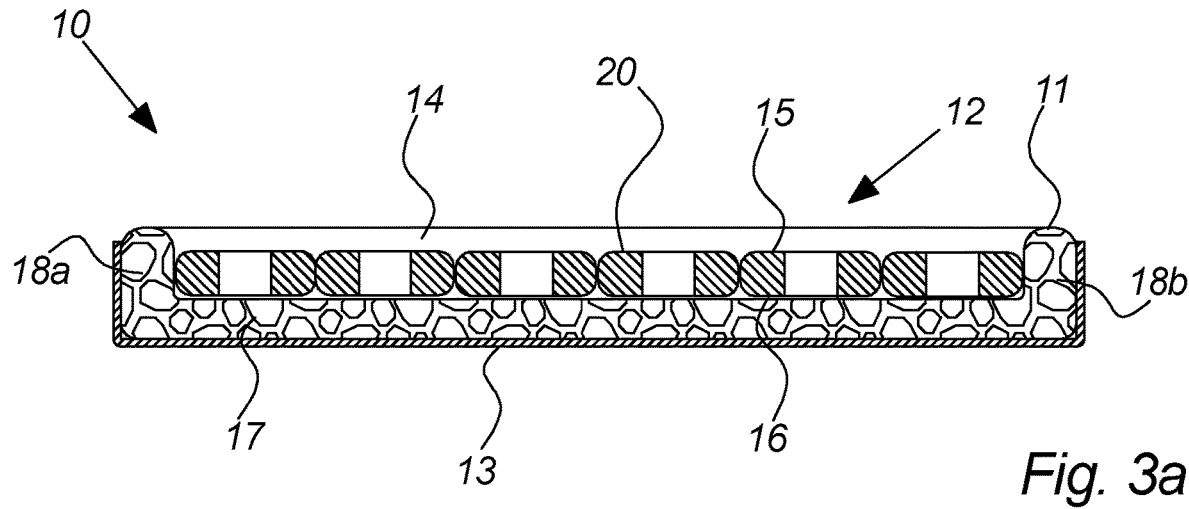
Figure 3B:
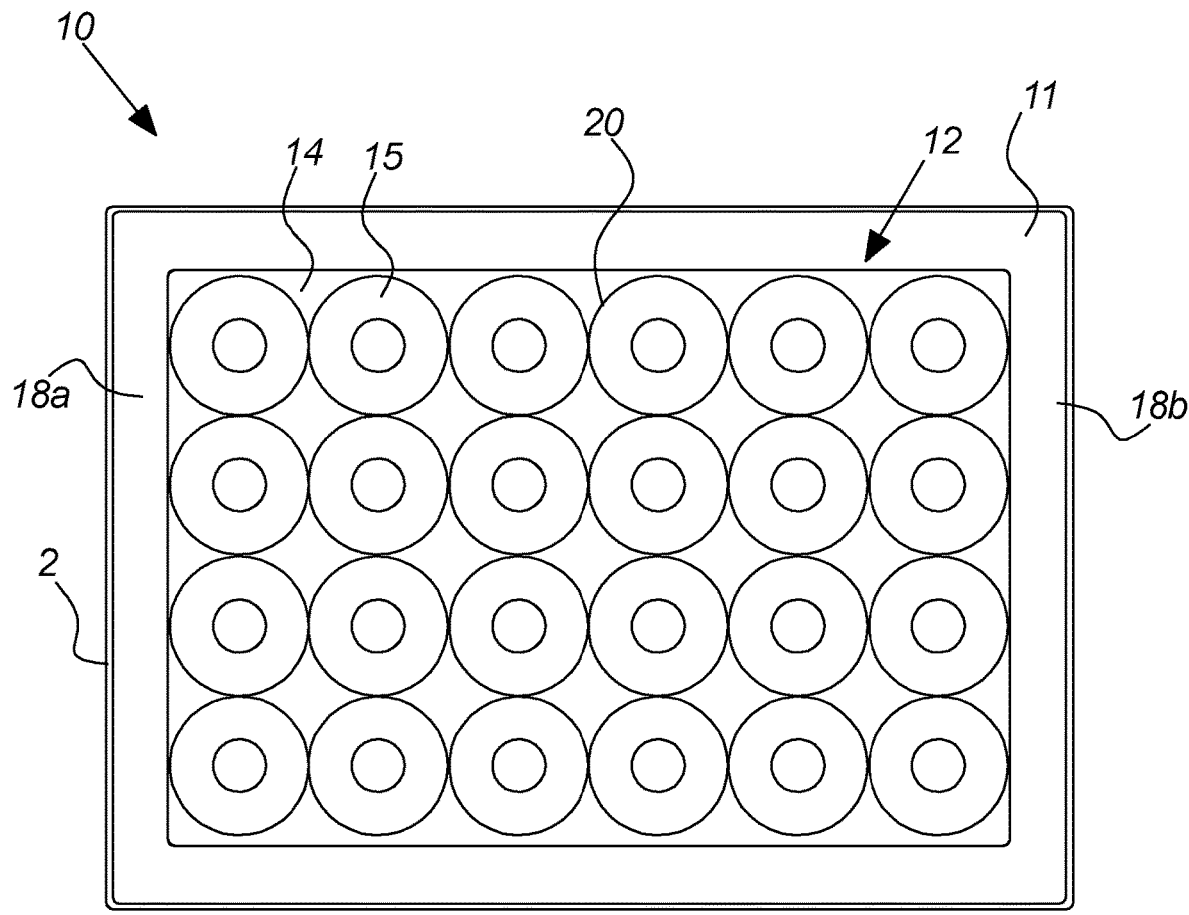

FIGS. 3a and 3b illustrate another embodiment of a disposable grill 10 according to the invention.

FIG. 3a illustrates a cross sectional view centrally through the disposable grill 10 as seen from the side. The insert structure 11 and the base tray 13 corresponds with the insert structure and base tray described above in relation to especially FIG. 2a.

However, the fuel 12 is illustrated in FIGS. 3a and 3b as comprising 24 circular shaped fuel elements 20 instead of a single fuel element. Each of the circular shaped fuel elements 20 has a through-going centre hole which provide them with a donut shaped look while maintaining even upper and lower surfaces 15, 16 in the tray 14.

The fuel 12 comprising the circular shaped fuel elements 20 in the tray of the insert structure still maintain a substantially plate shaped form.

Figure 4:
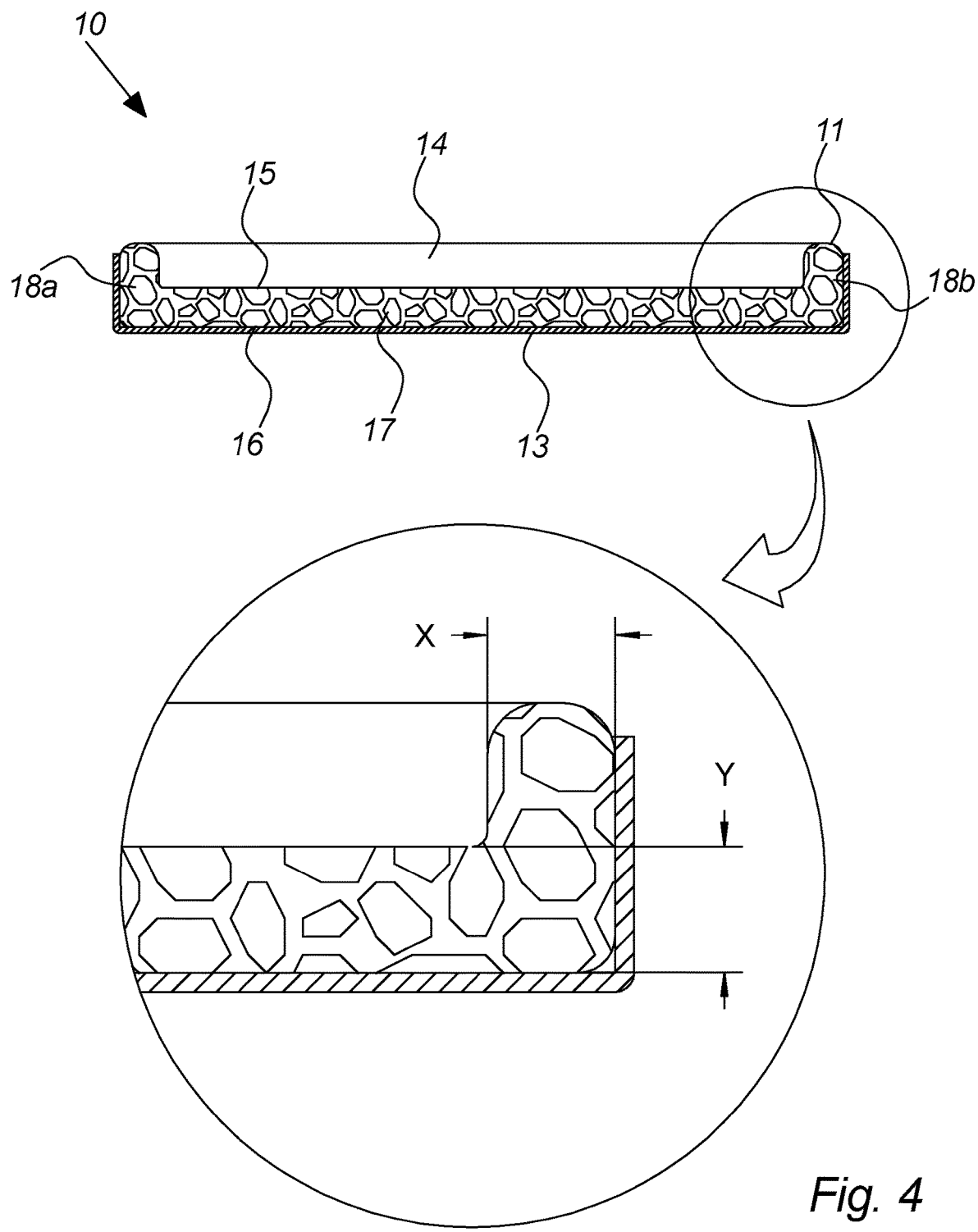

FIG. 4 including the enlargement illustrates parts and dimensions of the disposable grill shown in FIG. 2a in greater details. The fuel 12 is removed from the disposable grill 10 in the figure for clarity reasons. One corner of the insert structure 11 and base tray 13 is enlarged to illustrate the wall thicknesses X, Y at the side wall 18b and the bottom part 17 of the insert structure 11.

The figure illustrates the wall thicknesses X, Y of the insert structure 11 as being of similar size but especially the wall thickness Y of the bottom part 17 may also be larger than the wall thicknesses X of the side walls to cope with the larger heat content being radiated downwards.

The wall thickness X, Y is preferably defined at locations in the sidewalls and bottom part wherein the thickness is naturally disposed to be at a minimum and where the base tray 13 is located on the other side of the locations.

The insert structure 11 is preferably designed accordingly by minimising at least one wall thickness of the insert structure 11 in relation to the one or more above-mentioned characteristics of the fuel 12 and base tray 13.

Figure 5:
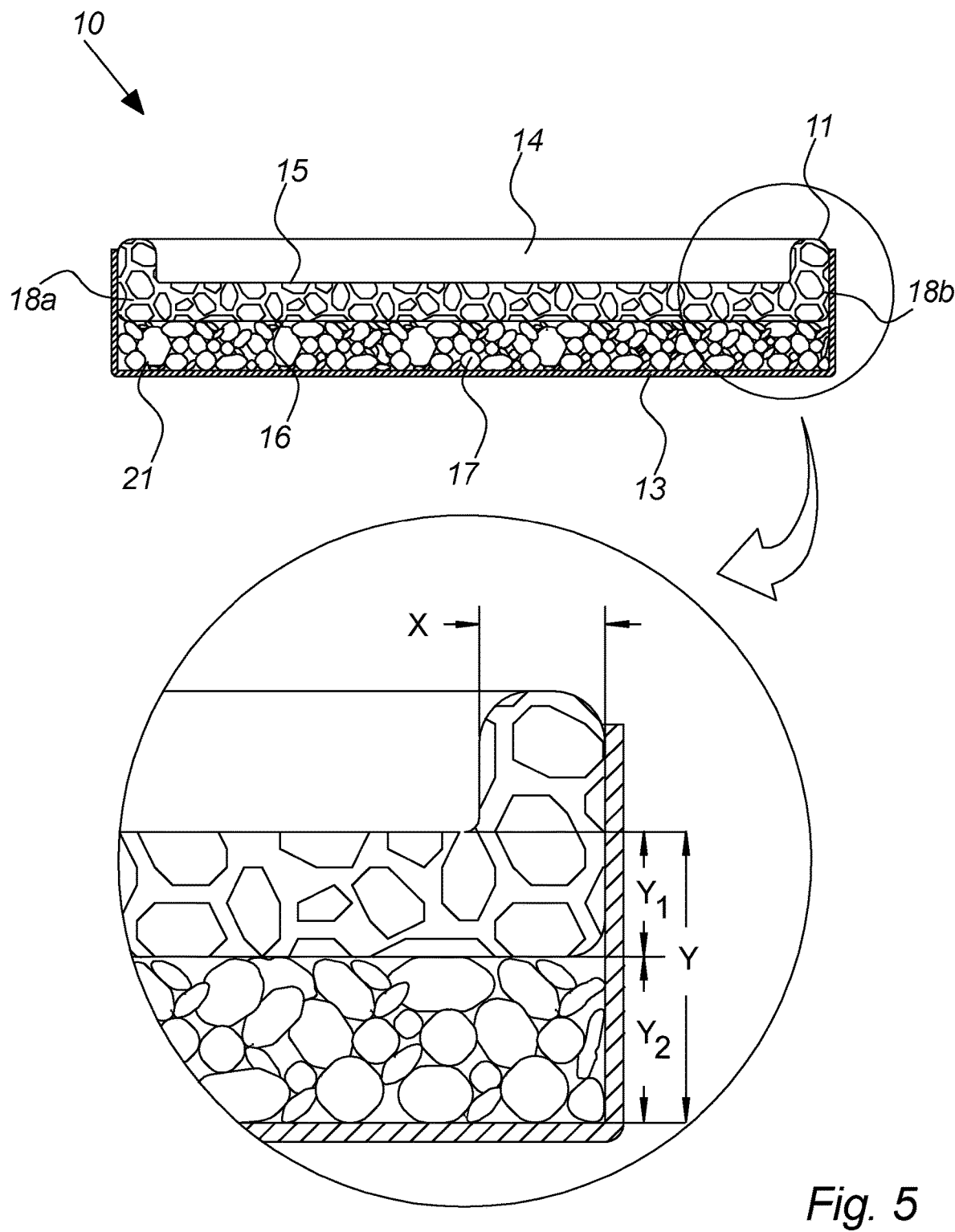

FIG. 5 illustrates in greater details parts and dimensions of another embodiment of the disposable grill 10 as previously shown in FIG. 2a.

The disposable grill 10 is provided with a layer of loose heat insulating material 21 positioned between the insert structure 11 and base tray 13. The layer of loose heat insulating material 21 is preferably positioned just beneath the insert structure 11 and held in place by the base tray 13 as illustrated in the figure.

The layer of loose heat insulating material 21 has in a preferred embodiment of the invention a wall thickness $Y_2$ between 10 and 40 millimetres such as 15 millimetres together with a wall thickness $Y_1$ of the insert structure 11 between 10 and 40 millimetres such as 15 millimetres.

The insert structure is to be understood as any kind of device, means, arrangement or other made from a thermal insulating material capable of significantly lowering the thermal conductivity. Such insulating material may include any kind of material having a low thermal conductivity i.e. typically below 0.5 watts per meter kelvin (W·m−1·K−1) such as perlite, mineral wool or foam, ceramic insulation tiles, glass foam, polyurethane foam, paper, expanded polystyrene, expanded clay, amorphous volcanic glass, slag or other or any combination thereof. However, to also be fireproof some of the listed materials would have to be coated or otherwise treated with one or more fire-retardants' or be mixed or coated with other materials ensuring the fireproof quality of the insert structure.

The loose heat insulating material 21 and the insert structure 11 are preferably made in the same material such as perlite.

Figure 6A:
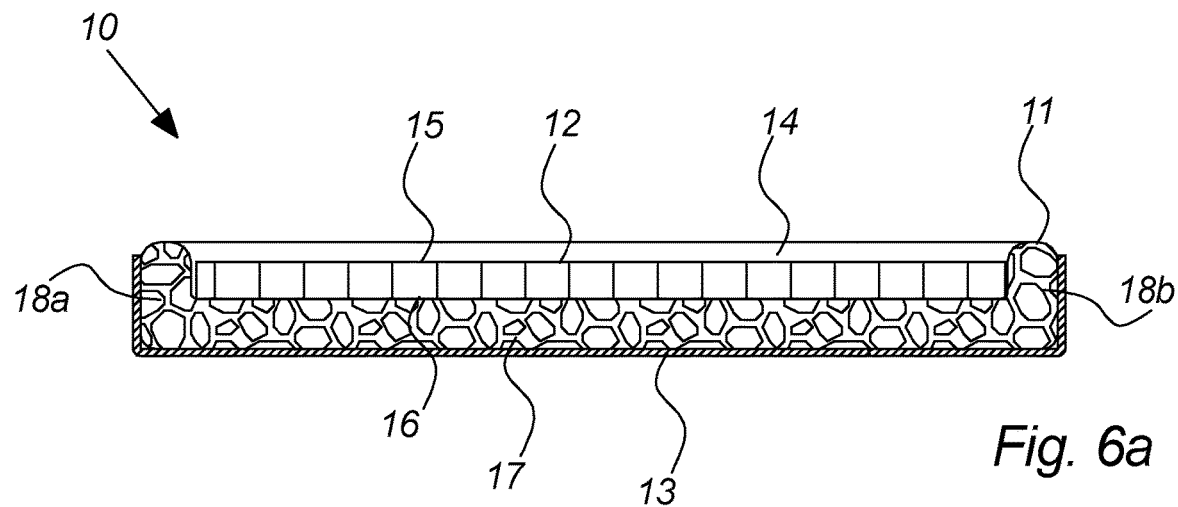
Figure 6B:
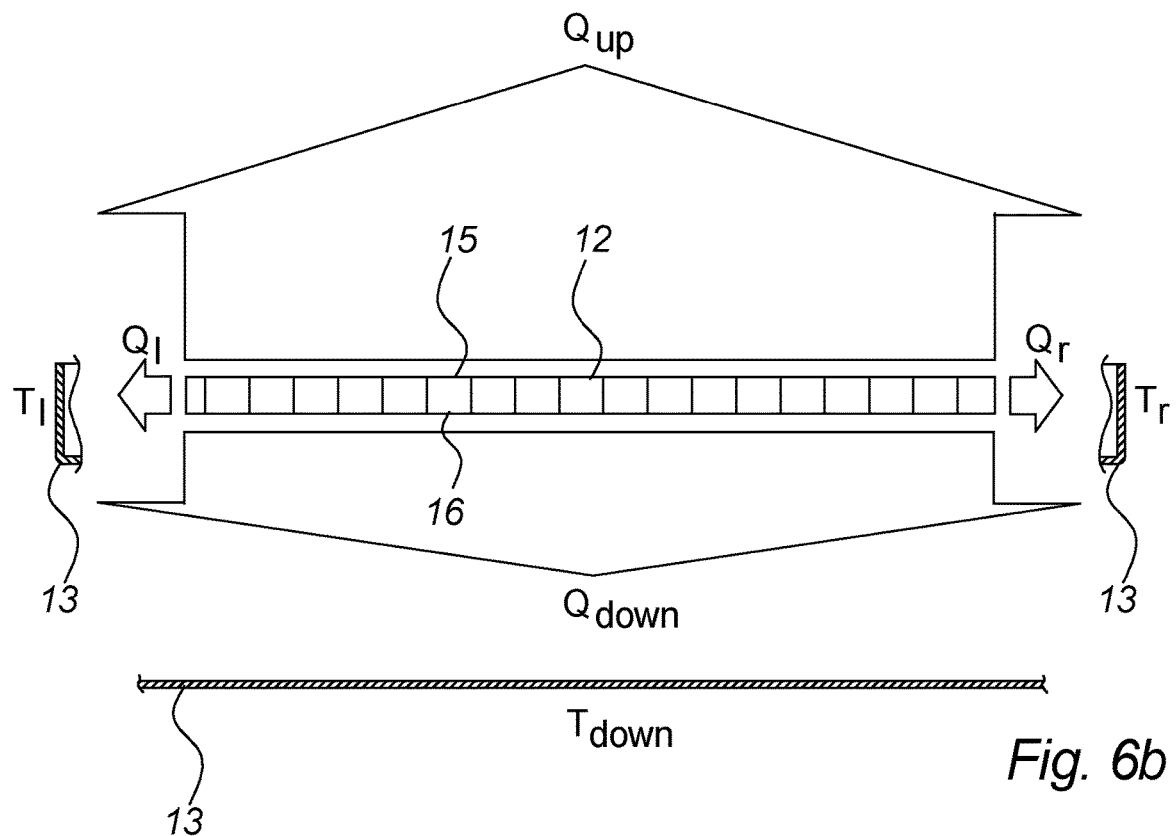

FIGS. 6a and 6b illustrate radiated heat content from an embodiment of the disposable grill 10 according to the invention. The disposable grill 10 illustrated in FIG. 6a is the same as the illustrated grill in FIG. 2a and the figure is only included again for clarity reasons.

FIG. 6b illustrates schematically with arrows the heat content radiated from the fuel 12 toward the food to be grilled and toward base tray 13 via the insert structure 11 when the fuel is ignited and burns uniformly.

The largest arrow illustrates schematically the heat content $Q_{up}$ radiated up toward the food to be grilled.

The smaller arrows illustrate schematically the heat content $Q_l$, $Q_r$ radiated toward the side walls of the base tray 13 and the heat content $Q_{down}$ radiated down toward the bottom part of the base tray 13, respectively. The radiated heat contents $Q_l$, $Q_r$ and $Q_{down}$ provide via the insert structure 11 the corresponding temperatures $T_l$, $T_r$ and $T_{down}$ on the outer surfaces of the base tray 13.

The wall thicknesses of the insert structure 11 may be defined by one or more desired work temperature on the outer surfaces of said base tray 13 in an embodiment of invention. A desired work temperature $T_l$, $T_r$ for the outer side wall surfaces of the base tray 13 is chosen to be between 40 and 80° C. such as between 45 and 60° C. e.g. approx. 50° C. in order for a user to be able comfortably to handle the burning disposable grill at the side walls without using gloves or similar heat protective means. A desired temperature $T_{down}$ for the outer bottom surface of the base tray 13 is chosen to be between 80 and 170° C. such as between 100 and 140° C. e.g. approx. 120° C. in order for the burning disposable grill to be able to stand on a wooden table or similar furniture without risk of damaging the furniture surface.

The desired work temperatures may be achieved by using the above mentioned wall thicknesses and fuel weights such as a side wall thickness of approx. 25 millimetres, a wall thickness at the bottom part of between 20 and 70 millimetres such as approx. 30 millimetres and a shaped fuel weight of approx. 300 grams in establishing a disposable grill of a standard size.

The insert structure 11 is preferably designed accordingly by minimising at least one wall thickness of the insert structure 11 in relation to the one or more above-mentioned characteristics of the fuel 12 and base tray 13.

The above figures do not illustrate any grate means in connection with a disposable grill but the grill will normally be provided with some kind of grid, mesh, grille, lattice, screen or any other kind of grate suitable for placing over the heat source of the disposable grill while carrying the food to be grilled.

The grate means could be formed as a number of mutually connected individual parts, as a single part, as a number of single parts or any combination thereof.

Figure 7:
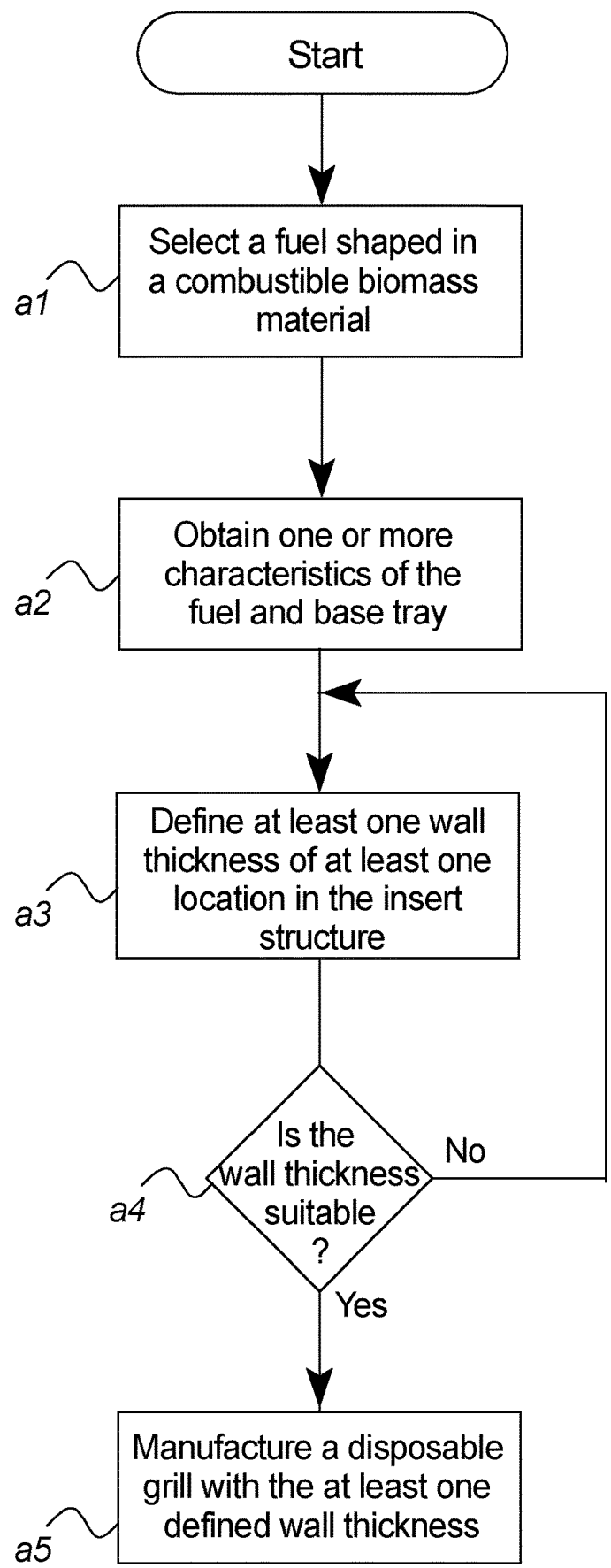

FIG. 7 illustrates a flow diagram disclosing a method of manufacturing a disposable grill.

The disclosed method includes the following steps:

a1) Select a fuel shaped in a combustible biomass material.

a2) Obtain one or more characteristics of the fuel and base tray.

a3) Define at least one wall thickness of at least one location in the insert structure.

a4) Control that the defined wall thickness of the disposable grill is suitable e.g. in relation to the base tray.

The subject matter behind method steps a1-a4) has already been described above e.g. in relation to FIGS. 2a to 5.

a5) Manufacture a disposable grill with the at least one defined wall thickness if the result of the above control is positive.

The manufacturing process of disposable grill 10 may include the steps of forming or molding of the insert structure 11 with the defined wall thicknesses and shaping of the fuel 12. The fuel 12 is positioned in the tray 14 of the insert structure 11 before grate means, paper with user instructions or the like are added e.g. on top of the insert structure and fuel. Finally, the base tray 13 is provided as an outer cover for the disposable grill 10.

The manufacturing process of disposable grill 10 may include the alternative steps of using an insert structure in a loose material which is located and fixed in the base tray for example by using a binder or cover material. The cover material may for example be cardboard with a profile shaping the loose insert material to form the upper part of the side walls and the tray in the insert structure before the shaped fuel is added in the cardboard covered tray in the manufacturing process. The cover will assist in maintaining the shape of the insert structure and especially keep the loose insert material in place during transportation of the disposable grill. The cover will quickly burn away when the grill is ignited and the loose material will maintain the shape of the insert structure by the material characteristics of the loose material e.g. being a perlite material.

The invention has been exemplified above with reference to specific examples of disposable grills 10 including insert structure 11, fuel 12 and base tray 13. However, it should be understood that the invention is not limited to the particular examples described above but may be designed and altered in a multitude of varieties within the scope of the invention as specified in the claims.

LIST

1. A well-known disposable grill
2. Container in a disposable material for carrying a combustible heat source
3. Lumps of charcoal as the combustible heat source
4. Lower support structure for the container
10. Disposable grill in embodiments according to the invention
11. Insert structure made in a heat insulating material
12. Fuel shaped in a combustible biomass material
13. Base tray as an outer grill cover made in a flammable material
14. Tray in the insert structure for containing the fuel
15. Upper surface of the fuel
16. Lower surface of the fuel
17. Bottom part of the grill
18a-d. Side walls in the grill
19. Through going holes in the fuel
20. Circular shaped briquettes such as having a donut shape with a centre hole
21. Layer of loose heat insulating material
L, W, D. Length, width and depth/thickness of the fuel
Q. Radiated heat content from the fuel
T. Temperature
X. Wall thickness of at least one location in a side wall of the insert structure
Y. Wall thickness of at least one location in a bottom part of the insert structure
$Y_1, Y_2$. Wall thicknesses of at least one location in separate layers of the bottom part
a1-a5. Steps of a flow diagram disclosing a method of manufacturing a disposable grill

The invention claimed is:

1. A disposable grill comprising:
    a base tray delimiting an outer grill cover and made in a flammable material;
    a fuel comprised of a combustible biomass material; and
    an insert structure made of a heat insulating material for holding said fuel and partly or fully covering said base tray;
    wherein said insert structure is shaped as a tray with sidewalls and a bottom part;
    wherein a thickness of a location of said sidewalls is defined by a characteristic of said fuel and said base tray; and
    wherein said sidewalls and said bottom part of said insert structure are pre-molded to form one or more unitary structures shaped to fit within the base tray.

2. The disposable grill of claim 1, wherein said fuel is plate shaped with at least substantially even upper and lower surfaces.

3. The disposable grill of claim 1, wherein the characteristic includes a length and a width of said shaped fuel being substantially larger than a thickness of said fuel, said thickness between 12 and 15 millimeters in relation to a width and length larger than 100 millimeters of said fuel, where the width range is 150 to 180 millimeters.

4. The disposable grill of claim 1, wherein the characteristic includes size, shape and/or number of elements in said fuel.

5. The disposable grill of claim 1, wherein said fuel is charcoals.

6. The disposable grill of claim 1, wherein said fuel comprises a briquette shaped in compressed coal or biofuel powder.

7. The disposable grill of claim 1, wherein said fuel being held or clamped in said tray of the insert structure by selection of the lengths and widths of said tray and fuel.

8. The disposable grill of claim 1, wherein said wall thickness being the same for a location in each sidewall or the same for a location in each sidewall and bottom part of said insert structure.

9. The disposable grill of claim 1, wherein the wall thickness is larger in said bottom part than the wall thickness in any sidewall of said insert structure.

10. The disposable grill of claim 1, wherein the wall thickness of the side walls is in the range of 15 to 40 millimeters.

11. The disposable grill of claim 1, wherein said base tray is made in a cardboard material with said characteristic including an autoignition temperature above approximately 218° C.

12. The disposable grill of claim 1, wherein said characteristic includes a predefined weight of said fuel comprising a weight between 200 and 1500 grams.

13. The disposable grill of claim 1, wherein said insert structure is made in a perlite material.

14. The disposable grill of claim 1, wherein said heat insulating material comprises loose material fixed with a binder or cover material to maintain a position.

15. The disposable grill of claim 1, wherein said a wall thickness of said insert structure being defined by a desired work temperature on the outer surfaces of said base tray between 40 and 80° C. for the outer side wall surfaces of the base tray and/or between 80 and 170° C. for the outer bottom surface of said base tray.

16. The disposable grill of claim 1, wherein said characteristic includes the radiated heat content of said predefined amount of combustible biomass material.

17. The disposable grill of claim 16, wherein said radiated heat content is in a range of 5.000 to 9.000 calorie/gram.

18. The disposable grill of claim 1, wherein the bottom part of said insert structure has a wall thickness between 20 and 70 millimeters.

19. The disposable grill of claim 1, wherein a layer of loose heat insulating material is positioned between said insert structure and base tray below the bottom part of said insert structure.

20. The disposable grill of claim 19, wherein said layer of loose heat insulating material has a wall thickness between 10 and 40 millimeters and said insert structure has a wall thickness between 10 and 40 millimeters.

21. A method of manufacturing a disposable grill comprising a base tray as an outer grill cover made in a flammable material and an insert structure in a heat insulating material, said method comprising the steps of:
    selecting a fuel shaped in a combustible biomass material to be located in said insert structure,
    defining a wall thickness of a location in said insert structure by using a characteristic of said fuel and said base tray,
    pre-molding sidewalls and a bottom part of said insert structure to form one or more unitary structures shaped to fit within the base tray;
    positioning said fuel in the insert structure, and
    covering said insert structure including the positioned fuel with said base tray.

* * * * *